June 25, 1963   B. GAIENNIÉ   3,095,492
CONTROLLED RESISTANCE SPOT HEATING DEVICE
Filed Dec. 26, 1961   3 Sheets-Sheet 3
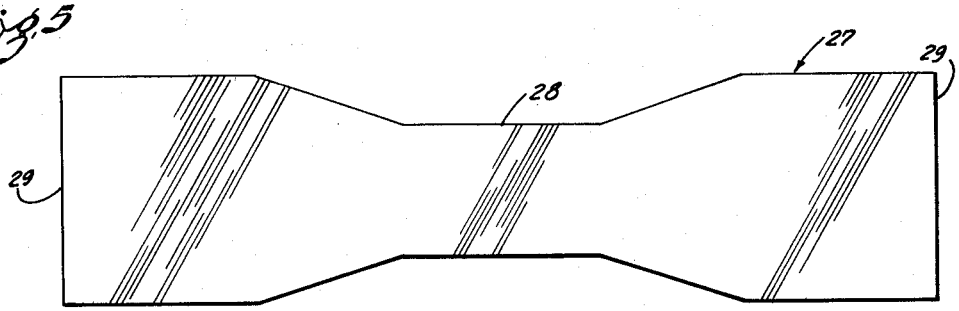
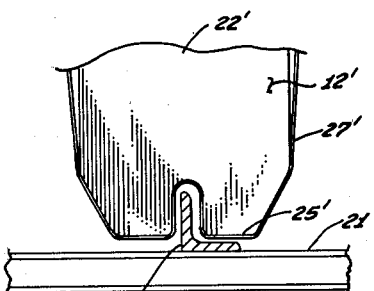
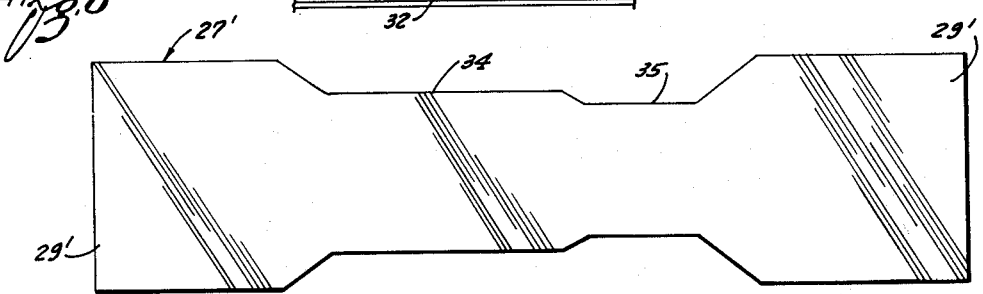
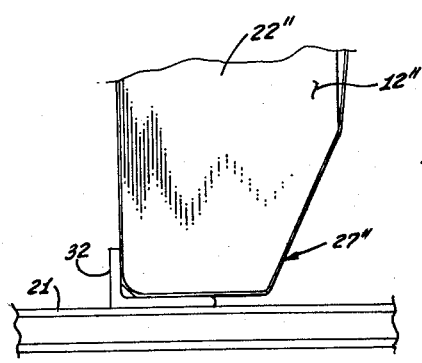
INVENTOR:
Bernard Gaiennié
By Willard M. Graham
Agent United States Patent Office 3,095,492
Patented June 25, 1963

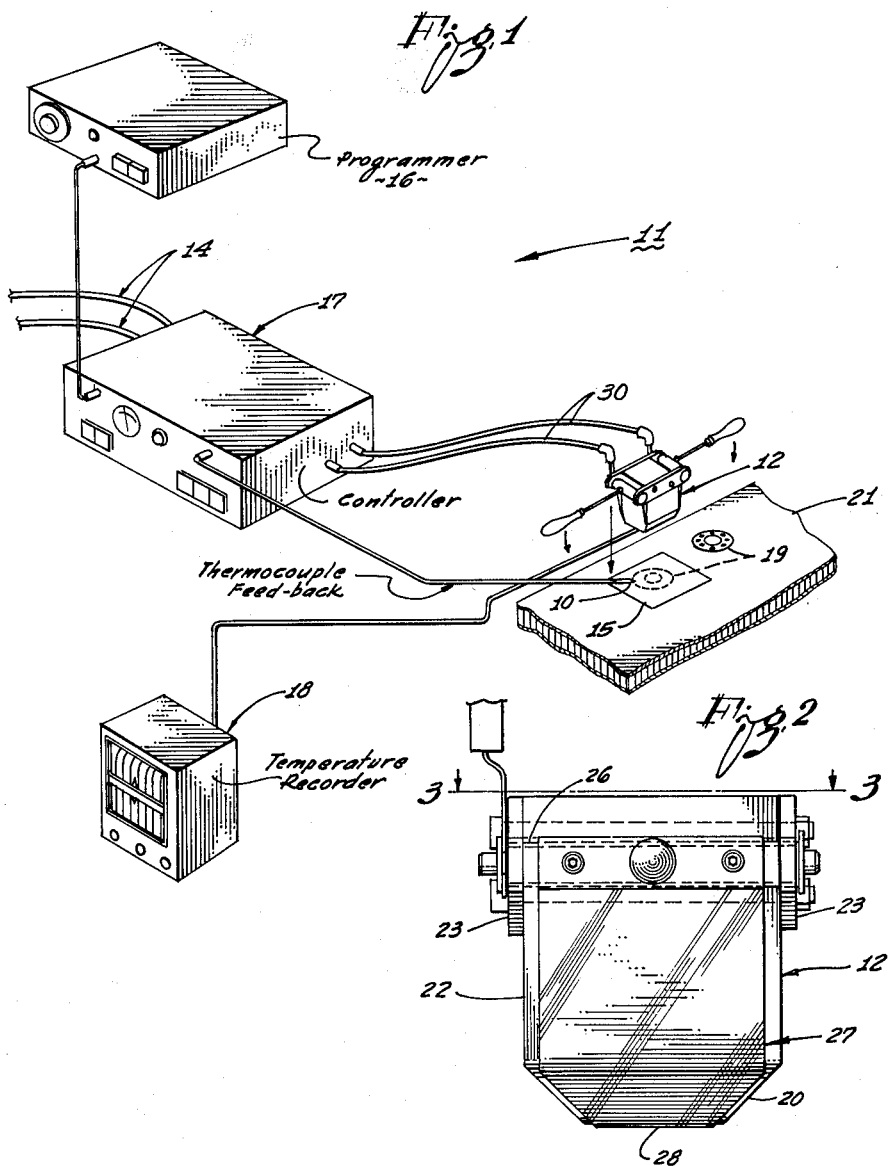

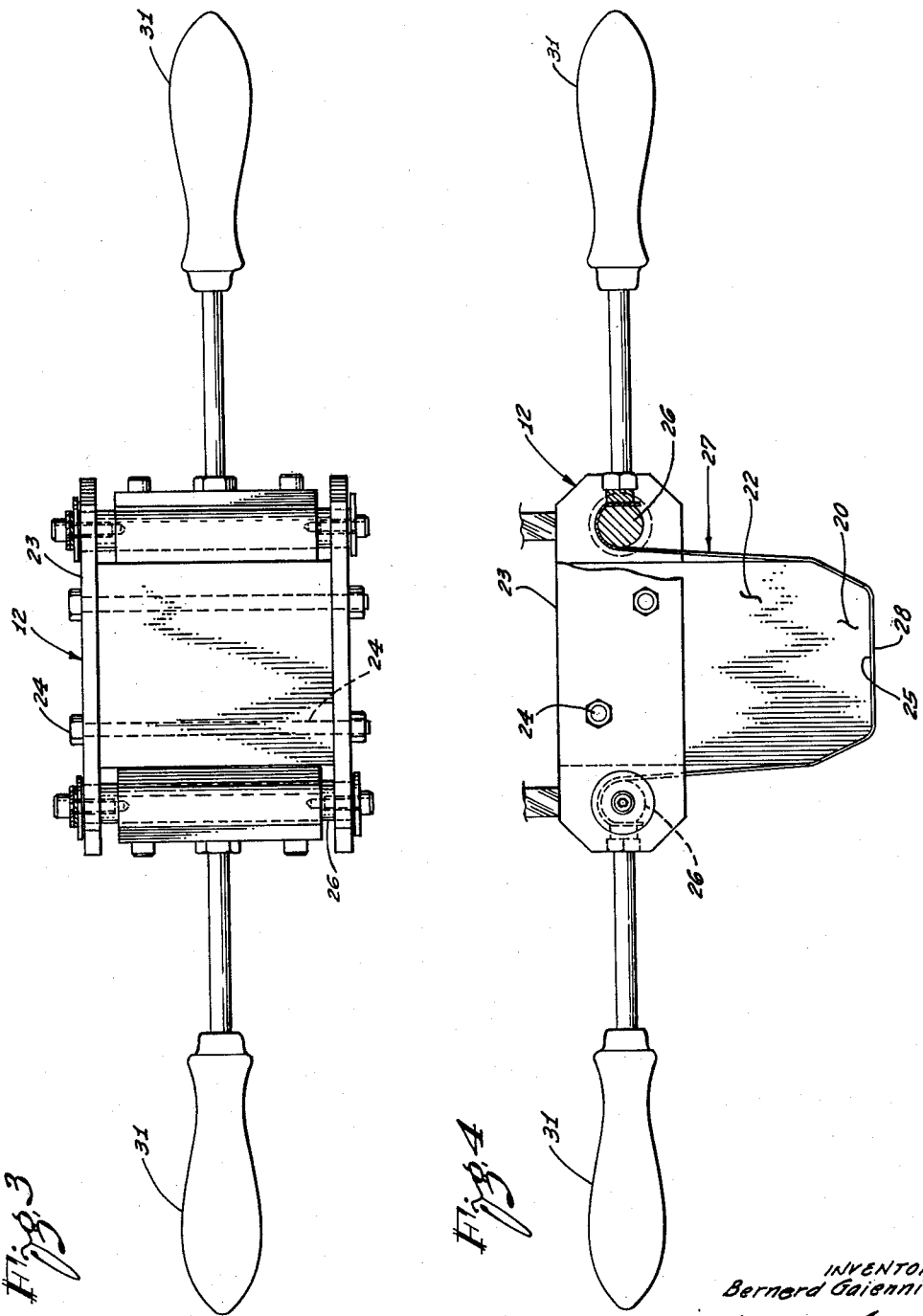

3,095,492
CONTROLLED RESISTANCE SPOT HEATING
DEVICE
Bernerd Gaiennié, Manhattan Beach, Calif., assignor to Northrop Corporation, Beverly Hills, Calif., a corporation of California
Filed Dec. 26, 1961, Ser. No. 162,082
3 Claims. (Cl. 219—21)

This invention pertains to a method and apparatus for effecting a brazing operation and more particularly to a method of brazing a component to an assembly which has previously been fabricated by a brazing operation, the operation precluding damage to the assembly and apparatus in effecting the operation.

Throughout this specification and claims the term "brazing" or "brazing operation" not only embraces brazing operations but also includes soldering, diffusion bonding and other like techniques.

Frequently it becomes necessary to add components to a brazed structure after its initial fabrication by a brazing operation. For example, it may become necessary to braze a bracket or other component to a brazed cellular core panel after its initial fabrication. Utilizing presently known apparatus and techniques constitutes a troublesome and time consuming operation, the foregoing is especially true if the component is to be added to the panel after it has been initially assembled; for example, mounted in an aircraft or the like.

In effecting a brazing operation as outlined above it is imperative that the temperature of the brazed panel or any part thereof does not exceed the temperature at which the panel was originally fabricated. The temperature employed to originally fabricate the panel is hereinafter referred to as the primary temperature and the operation as the primary brazing operation. The temperature subsequently employed to braze components to the original panel is hereafter referred to as the secondary temperature and the operation as the secondary brazing operation.

If, during a brazing operation in which a component is to be brazed to a previously brazed cellular core panel or the like, the secondary temperature exceeds the primary temperature the original panel will be irreparably damaged and must be discarded.

Accordingly it is a prime object of this invention to provide apparatus facilitating a brazing operation in which a component may be brazed to a previously brazed cellular core panel or like structure and in which the possibility of thermal damage to the panel is eliminated.

Another object is to provide a controlled electric resistance heating device which is mobile, simple in design, rugged in construction, economical to manufacture and which may be easily adapted to any purpose for which it is intended.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURE 1 schematically illustrates apparatus utilized to effect the brazing operation as disclosed herein.

FIGURES 2, 3 and 4 constitutes plan and elevational views of the heating unit comprising a component of the apparatus shown in FIGURE 1.

FIGURE 5 constitutes a plan view of the heating element of the heater shown in FIGURES 2, 3 and 4, the element being shown in its developed state.

FIGURES 6 and 7 are fragmentary side views of other embodiments of the heating unit similar to that shown in FIGURES 2, 3 and 4.

FIGURE 8 is a plan view illustrating one configuration which the heating element utilized in the heating units of FIGURES 6 and 7 may assume, the heating element being shown in its developed state.

Referring to the drawings, FIGURE 1 illustrates apparatus utilized in effecting a brazing operation as disclosed therein, the apparatus being indicated generally by the numeral 11. The brazing apparatus includes a heating unit 12, an electric power source 14, a programmer 16, a control unit 17 and a temperature recorder 18, these components being assembled substantially as shown. The duration of the heating operation is controlled by the programmer 16 while the flow of current to the unit 12 is controlled by the unit 17. A thermocouple 10 is positioned in contact with the component being brazed and therefore measures its temperature. The temperature recorder 18 merely provides a permanent record of the temperature at which a brazing operation is carried out. Also, it will be understood that during a brazing operation a piece of thermal conducting electrical insulating material 15, for example, a sheet of glass cloth or like material, is positioned over the component 19 thus shorting of the heater 12 through the panel 21 is precluded.

The embodiment of the heating unit shown in FIGURES 2, 3 and 4 includes a body portion 22 constructed of glass rock or other suitable electrical insulating material. The body portion 22 is generally of cubical configuration except for its lower portion. The lower portion 20 of the body portion 22 is of pyramidal configuration and is truncated to provide a plane surface 25 of reduced area.

Attached to the upper portion of the body portion 22 is a pair of strip members 23, also fabricated of an electrical insulating material. The strips 23 are secured to the portion 22 in opposed relation by means of bolts 24. Pivotally mounted in the members 23, also in opposed relation, is a pair of cylindrical members 26 constructed of a material having good electrical conducting characteristics. Attached to the cylindrical members 26, substantially as shown in FIGURES 2, 3 and 4 is a flexible metallic electrical conductor 27 of strip-like configuration as shown in its developed form in FIGURE 5.

The metallic strip 27 is fabricated of an electrical conduction material having a high resistance to oxidation at elevated temperatures, for example, an alloy consisting of approximately 78% nickel, 15% chromium and 7% iron is quite suitable for this purpose. The cross-sectional area of the conductor 27 is reduced adjacent its mid-section. In the embodiment of the conductor shown in FIGURE 5, the area of reduced cross-section, identified by the numeral 28, is effected by reducing its width. However, the cross-sectional area of the conductor 27 may also be reduced by reducing its thickness. Either of these operations will provide a section having a high resistance to the flow of electricity through the conductor 27 and will cause the section 28 to attain an elevated temperature as electricity flows through the conductor.

In assembling the conductor 27 on the body portion 22 it will be seen that the portion 28 of the conductor has a contacting relation with respect to the surface 25 of the body portion 22. The ends 29 are fixedly secured to the cylindrical members 26 by suitable means. Also attached to the members 26, substantially as shown in FIGURES 2, 3 and 4, are handles 31. The handles provide means for removing slack from the conductor 27 as the latter expands or contracts due to temperature changes occurring therein, for applying pressure to the unit 12 at such time as the latter is being utilized to perform a brazing operation and as a convenient means for transporting the unit 12.

Electrical connectors 30 function to provide a path for the flow of electrical current between the control unit 17 and the heating unit 12. Ends of the connectors 30 are attached to the cylindrical members 26, accordingly it will be apparent that the conductor 27 is connected in series with the connectors 30.

In effecting a brazing operation the component 19 is positioned on the panel 21 in the position it is to have when the brazing operation is complete. Suitable brazing material is utilized in effecting the brazing operation. The aforementioned thermocouple 10 is positioned in contact with the component 19 and as positioned functions to provide feed-back signal to the control unit 17 indicative of the temperature of the component 19. The sheet material 15 is now positioned over the component 19 and the heating unit 12 positioned in contact with the sheet material 15 at a location directly above the component 19. In other words, in effecting the brazing operation, the portion 28 of the conductor positioned directly over the component 19 and is spaced therefrom only by the thermal conducting sheet 15.

During a brazing operation suitable pressure is applied to unit 12 by means of the handles 31. The handles 31 function as previously mentioned to maintain the conductor 27 in a taut condition when pressure is applied thereto, accordingly a firm and complete contact is maintained between the portion 28 of the strip 27 and the component 19 separated only by the sheet 15. In view of the fact that signals, indicative of the temperature of the component 19, are continuously fed back to the control unit 17 it will be apparent that the temperature of the component 19, consequently the temperature of the panel 21, may be maintained at any desired temperature during a brazing operation.

Thus, assuming that the brazing material utilized to braze the component 19 to the panel 21 has a lower brazing temperature than that utilized in fabricating the panel 21, it will now be apparent that the secondary brazing operation may be readily effected without damage to the panel 21. It may be effected at a higher temperature of short duration, in other words, the secondary brazing operation may be completed before the primary brazing temperature is reached. It will thus be seen that the unit 12 provides means whereby brazing operations as just described may be carried out and will provide the many advantages as discussed above.

The embodiment of the heating unit 12' as shown in FIGURE 6, is quite similar to the heating unit 12 (FIGURES 2, 3 and 4). It will be seen, however, that the body portion 22' of the unit 12' has a groove 33 formed therein opening on the face 25'. The strip 27' is positioned in the groove 33. Accordingly the strip 27' practically surrounds the upstanding leg of the angle 32. The conductor 27' is shown in its developed form in FIGURE 8, by referring to this figure it will be seen that the conductor consists of end portions 29' and two intermediate portions 34 and 35 of reduced cross-sectional area. The strip is constructed so that the portion 35 is of less cross-sectional area than the portion 34, accordingly the temperature of the portion 35 will exceed that of portion 34 at such times as electrical current is flowing through the conductor 27'. The body portion 22' and the conductor 27' are proportioned so that, at such time as the conductor 27' is mounted on the body portion 22', the portion 34 surrounds the upstanding leg of the angle 32 while the portion 35 contacts the leg of the angle 32 to be brazed to the panel 21. In this embodiment the insulating sheet 15 is also positioned between the strip 27' and the angle 32 thus precluding the shorting of current as it flows through the conductor 27'.

A heating unit constructed in this manner provides the added advantage that the upstanding leg of the angle 32 is completely surrounded by a heating element and is effectively maintained at an elevated temperature. In a heating unit constructed in this manner, heat is retarded from bleeding-off from the upstanding leg of the angle 32, a more even temperature of the angle 32 is achieved resulting in a more effective and efficient braze. It will be apparent that a conductor constructed substantially as the conductor 27, shown in FIGURE 5, may also be used in the embodiment of the heater 22', in fact the conductor 27 may assume various configurations to satisfy requirements dictated by specific circumstances.

The embodiment of the heating unit 22" as shown in FIGURE 7 is also quite similar to the heating units previously described and shown in FIGURES 2, 3, 4 and 6. In this embodiment, however, the body portion 22" is designed so that a heating portion of the conductor 27" contacts a side surface of the upstanding leg of the angle 32. The insulating sheet 15 is also used in this embodiment to preclude shorting of electric current as it flows through the conductor 27". The advantages forthcoming from this embodiment are substantially the same as those discussed in connection with the heater 22' shown in FIGURE 6 and need not be repeated.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

I claim:

1. An electric heating unit comprising: a body portion generally of cubical configuration having opposed end faces and being fabricated of an electric insulating material; strip-like electric heating element including a portion intermediate the ends thereof of reduced cross-sectional area; a pair of electric conducting cylindrical members rotatably mounted in opposed relation adjacent one of said end faces of said body portion; the ends of said heating element being respectively secured to said cylindrical members with the portion of said heating element of reduced cross-sectional area being in full contact with the other one of said end faces; and a pair of handles one of which is fixedly secured to a respective cylindrical member extending radially thereof and functioning to provide means whereby slack may be removed from said electric heating element.

2. An electric heating unit comprising: a body portion generally of cubical configuration having opposed end faces and being fabricated of an electric insulating material; strip-like electric heating element having a portion intermediate the ends thereof of reduced cross-sectional area; a pair of electric conducting cylindrical members rotatably mounted in opposed relation adjacent one of said end faces of said body portion; a groove formed adjacent the other end face of said body portion and opening on said latter face; the ends of said heating element being respectively secured to said cylindrical members with the portion of reduced cross-sectional area being positioned in said groove and contacting the other one of said end faces; and a pair of handles one of which is fixedly secured to a respective cylindrical member extending radially thereof and functioning to provide means whereby slack may be removed from said heating element and also means whereby a force may be applied to said heating unit.

3. An electric heating unit comprising: a body portion generally of cubical configuration having top and bottom faces and at least one side face having a normal relation with respect to said bottom face and being fabricated of an electric insulating material; a strip-like electric heating element; said heating element including a first portion of reduced cross-sectional area with respect to its maximum cross-sectional area and a second portion having a cross-sectional area less than said first portion; a pair of electric conducting cylindrical members rotatably mounted in opposed relation adjacent said top face; the ends of said heating element being respectively secured to said cylindrical members with said second portion of reduced cross-sectional area in firm contact with said bottom face of said body portion and said first portion of reduced cross-sectional area being in contact with said one side face of said body portion; and a pair of handles one of which is fixedly secured to a respective cylindrical member extending radially thereof and functioning to provide means whereby slack may be removed from said heating element and also means whereby a force may be applied to said heating unit.

References Cited in the file of this patent

UNITED STATES PATENTS

| | | |
|---|---|---|
| 1,954,061 | Smith | Apr. 10, 1934 |
| 2,541,214 | Davis | Feb. 13, 1951 |
| 2,596,327 | Cox et al. | May 13, 1952 |
| 2,701,835 | Anton | Feb. 8, 1955 |
| 3,005,898 | Rosenthal | Oct. 24, 1961 |

FOREIGN PATENTS

| | | |
|---|---|---|
| 787,065 | France | June 24, 1935 |
| 243,985 | Switzerland | Feb. 1, 1947 |
| 1,035,129 | France | Apr. 15, 1953 |
| 810,742 | Great Britain | Mar. 25, 1959 |